United States Patent
Nagura et al.

(10) Patent No.: US 8,925,889 B2
(45) Date of Patent: Jan. 6, 2015

(54) VEHICLE SEAT SLIDING DEVICE

(75) Inventors: Mikihito Nagura, Okazaki (JP); Satoshi Masuda, Kariya (JP); Motoharu Yoshii, Kariya (JP); Toshihiro Kimura, Toyota (JP); Tsuneo Ogi, Anjo (JP); Ryousuke Mizuno, Novi, MI (US); Akihiro Chiba, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/241,522

(22) PCT Filed: Jun. 21, 2012

(86) PCT No.: PCT/JP2012/065904
§ 371 (c)(1),
(2), (4) Date: Feb. 27, 2014

(87) PCT Pub. No.: WO2013/035414
PCT Pub. Date: Mar. 14, 2013

(65) Prior Publication Data
US 2014/0203157 A1    Jul. 24, 2014

(30) Foreign Application Priority Data
Sep. 6, 2011 (JP) .................................. 2011-194122

(51) Int. Cl.
*F16M 13/00* (2006.01)
*B60N 2/07* (2006.01)
*B60N 2/08* (2006.01)

(52) U.S. Cl.
CPC ............ *B60N 2/0722* (2013.01); *B60N 2/0705* (2013.01); *B60N 2/0715* (2013.01); *B60N 2/0725* (2013.01); *B60N 2/0818* (2013.01); *B60N 2/085* (2013.01); *B60N 2/0875* (2013.01)
USPC .......................... 248/429; 248/424; 296/65.13

(58) Field of Classification Search
USPC ................. 248/429, 424, 430; 296/63, 65.13, 296/65.14
See application file for complete search history.

(56) References Cited

U.S. PATENT DOCUMENTS 5,806,825 A    9/1998    Couasnon
6,328,272 B1   12/2001   Hayakawa et al.
(Continued)

FOREIGN PATENT DOCUMENTS

JP    6-68915 U    9/1994
JP    9-104266 A   4/1997
(Continued)

OTHER PUBLICATIONS

English translation of the International Search Report issued Sep. 18, 2012, in PCT/JP2012/065904.
(Continued)

*Primary Examiner* — Anita M King
(74) *Attorney, Agent, or Firm* — Oblon, Spivak, McClelland, Maier & Neustadt, L.L.P.

(57) ABSTRACT

A vehicle seat sliding device includes: a first rail adapted to be fixed to one of a vehicle floor and a seat; a second rail adapted to be fixed to the other one of the vehicle floor and the seat, and coupled to the first rail in a relatively movable manner; an engagement member, which selectively limits and permits the relative movement of the first and the second rails; an operation member configured such that operating force to cancel the restriction of the relative movement in the second rail is transmitted to the engagement member; and a cover mounted on the first end of the second rail to close the first end. The cover has an engagement piece, which engages with a support wall provided in the second rail and restricts the pivoting of the cover when pressed against the operation member.

8 Claims, 5 Drawing Sheets

(56) References Cited

U.S. PATENT DOCUMENTS

| | | |
|---|---|---|
| 6,820,851 B2 | 11/2004 | Mochizuki et al. |
| 7,963,496 B2 * | 6/2011 | Kojima et al. ............... 248/429 |
| 7,992,834 B2 | 8/2011 | Kojima et al. |
| 2002/0060281 A1 | 5/2002 | Okazaki et al. |
| 2004/0131291 A1 | 7/2004 | Niimi et al. |
| 2010/0090083 A1 | 4/2010 | Kojima et al. |
| 2014/0239140 A1 * | 8/2014 | Yamada et al. ............... 248/429 |

FOREIGN PATENT DOCUMENTS

| | | |
|---|---|---|
| JP | 11-268563 A | 10/1999 |
| JP | 2002-154356 A | 5/2002 |
| JP | 2002-166758 A | 6/2002 |
| JP | 2004-51082 A | 2/2004 |
| JP | 2004-131003 A | 4/2004 |
| JP | 2005-41418 A | 2/2005 |
| JP | 2010-95096 A | 4/2010 |

OTHER PUBLICATIONS

English translation of the International Preliminary Report on Patentability and Written Opinion issued Mar. 12, 2014, in PCT/JP2012/065904.

U.S. Appl. No. 14/241,513, filed Feb. 27, 2014, Nagura, et al.

* cited by examiner

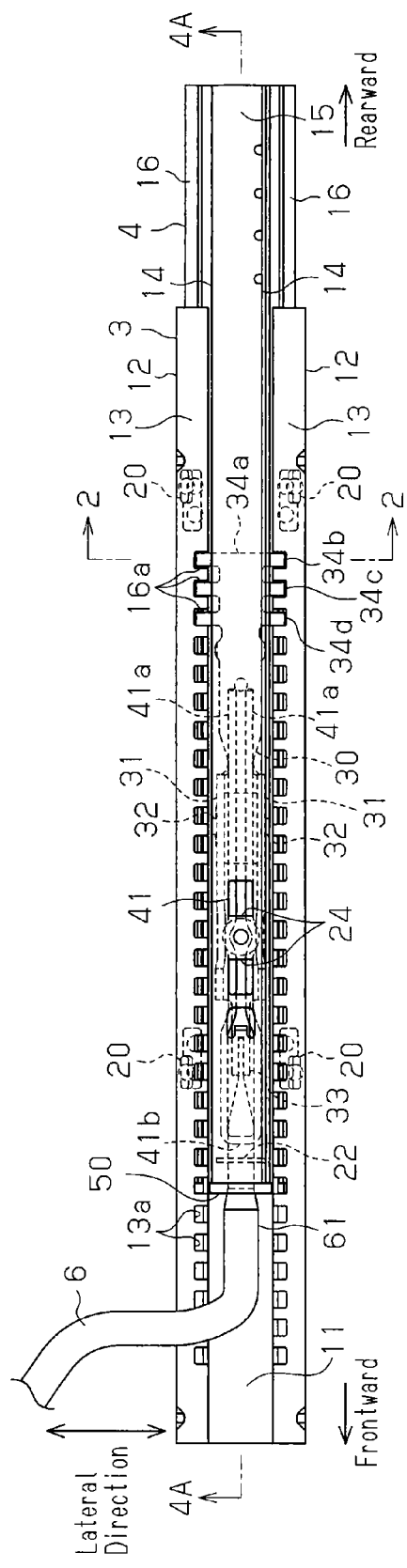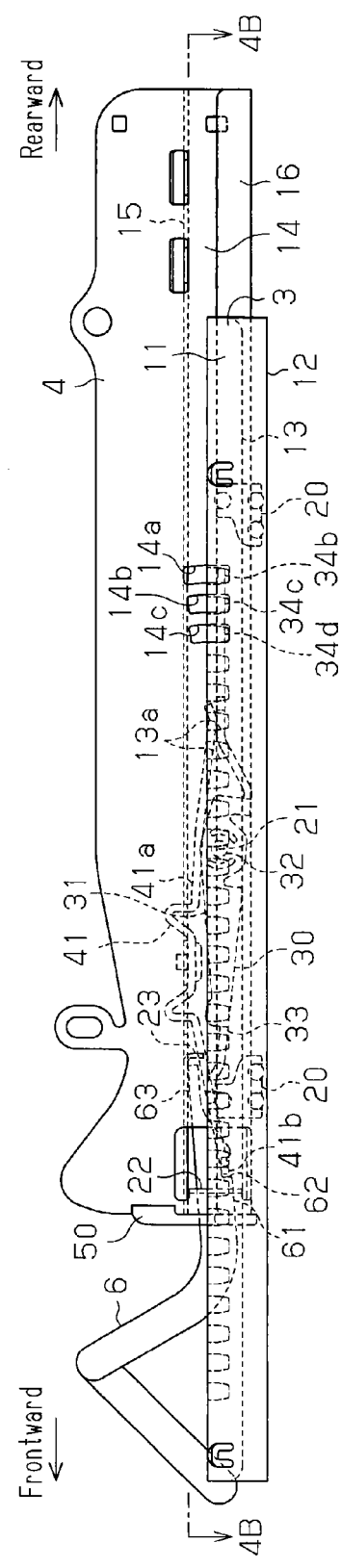

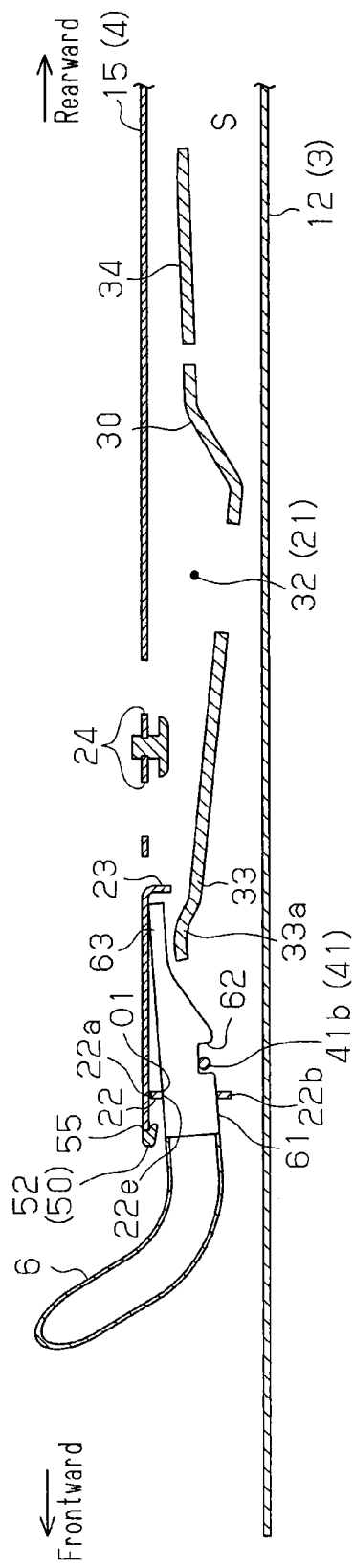

VEHICLE SEAT SLIDING DEVICE

FIELD OF THE INVENTION

The present invention relates to a vehicle seat sliding device.

BACKGROUND OF THE INVENTION

Patent Document 1 describes an example of a known vehicle seat sliding device. Such a vehicle seat sliding device includes lower rails and upper rails, and the upper rails are coupled with the lower rails in a movable manner. A plastic cover is mounted on the upper rail, which is formed by a plate, such that the cover closes a first end located at one end of the upper rail. Direct interference between the first end and surrounding parts may be avoided by reducing exposure of the first end of the upper rail in this manner.

PATENT DOCUMENT

Patent Document 1
Japanese Laid-Open Patent Publication No. 2010-95096

SUMMARY OF THE INVENTION

In the seat sliding device of Patent Document 1, the cover is mounted as an exclusive part functioning and shaped to avoid interference between the first end of the upper rail and the surrounding parts. Therefore, although it is presently desirable that various parts be provided with multiple functions to reduce the number and weight of components, the cover is an inefficient part having only a single function.

It is an object of the present invention to provide a vehicle seat sliding device that realizes multiple functions for a cover that closes an end of a rail.

In order to achieve the above described objective, a vehicle seat sliding device including a first rail, a second rail, an engagement member, an operation member and a cover is provided. The first rail is adapted to be fixed to one of a vehicle floor and a seat. The second rail is adapted to be fixed to the other one of the vehicle floor and the seat. The second rail is coupled to be movable relative to the first rail, and the second rail includes two side walls arranged in a lateral direction that is perpendicular to a longitudinal direction of the second rail, a coupling wall, which is arranged to face the first rail in a vehicle height direction and which couples basal ends of the side walls that are separated from the first rail, and a first end located at one end in the longitudinal direction. The engagement member selectively restricts and permits relative movement of the first rail and the second rail. The operation member is inserted into the second rail in the longitudinal direction, linked to the engagement member, and elastically held by a biasing member to come into contact with a support wall arranged in the second rail. The operation member is configured to pivot about a location contacting the support wall against biasing force of the biasing member to approach a portion of the coupling wall at the first end of the second rail so that operation force for disengaging the relative movement is transmitted to the engagement member. The cover is mounted on the first end of the second rail to close the first end. The cover includes an engagement piece, which restricts pivoting of the cover when the cover is engaged with the support wall and is pressed against the operation member.

According to the above configuration, the cover, which closes the first end, is mounted on the first end of the second rail. This limits exposure of the first end so that the direct contact of the first end with surrounding parts is avoided. When the vehicle vibrates and swings the operation member about the portion contacting the support wall, for example, the operation member is brought into contact with the cover when the operation member approaches the coupling wall at the first end. Accordingly, the operation member may limit the generation of the noise as compared to when the operation member directly contacts, for example, the first end. Further, when the operation member is pivoted against the biasing force of the biasing member to transmit the operation force that cancels the restriction of the relative movement of the first rail and the second rail to the engagement member, even if the cover is pressed by the operation member, the pivoting of the cover resulting from the pressing is limited by the engagement piece. Accordingly, the separation of the cover from the first end is limited when the cover is pivoted. That is, the cover functions to limit the noise by contacting the operation member, while functioning to prevent removal of the cover from the first end with the engagement piece when the cover is pressed by the operation member.

According to the second embodiment of the present invention, a vehicle seat sliding device including a first rail, a second rail, an engagement member, an operation member and a cover is provided. The first rail is adapted to be fixed to one of a vehicle floor and a seat. The second rail is adapted to be fixed to the other one of the vehicle floor and the seat. The second rail is coupled to be movable relative to the first rail. The second rail includes two side walls arranged in a lateral direction perpendicular to a longitudinal direction of the second rail, a coupling wall, which is arranged to face the first rail in a vehicle height direction and which couples basal ends of the two side walls that are separated from the first rail, and a first end located at one end in the longitudinal direction. The engagement member selectively restricts and permits relative movement of the first rail and the second rail. The operation member is inserted into the second rail in the longitudinal direction, linked to the engagement member, and elastically held by a biasing member to come into contact with a support wall arranged in the second rail at a location contacting the support wall. The operation member is configured to pivot about the location contacting the support wall against biasing force of the biasing member to approach the coupling wall at the first end of the second rail so that operation force for canceling the restriction of the relative movement is transmitted to the engagement member. The cover is mounted on the first end to close the first end. The cover includes an opposing surface, which opposes the operation member at a portion corresponding to the two side walls, and a sliding bead, which protrudes from the opposing surface and extends in a direction transverse to a path along which the operation member is inserted into the second rail to press the operation member.

According to the above configuration, the operation member inserted into the second rail on which the cover is mounted is positioned in the lateral direction when pressed against the sliding bead. The sliding bead limits the backlash of the operation member in the lateral direction. Accordingly, while positioning the operation member in the lateral direction in a more stable state with the sliding bead that contact the operation member in a concentrated manner, an increase in the sliding resistance during the release operation, that is, a decrease in the operability of the operation member may be limited. Further, the backlash in the lateral direction and the pivot direction during the release operation of the operation member, and the generation of noise caused by the backlash are limited.

BRIEF DESCRIPTION OF THE DRAWINGS

FIG. 3(a) is a plan view illustrating the seat sliding device;

FIG. 3(b) is a side view illustrating the seat sliding device;

FIG. 4(a) is a cross-sectional view taken along line 4A-4A in FIG. 3(a);

FIG. 4(b) is a cross-sectional view taken along line 4B-4B in FIG. 3(b);

DETAILED DESCRIPTION OF THE PREFERRED EMBODIMENTS

Figure 1:
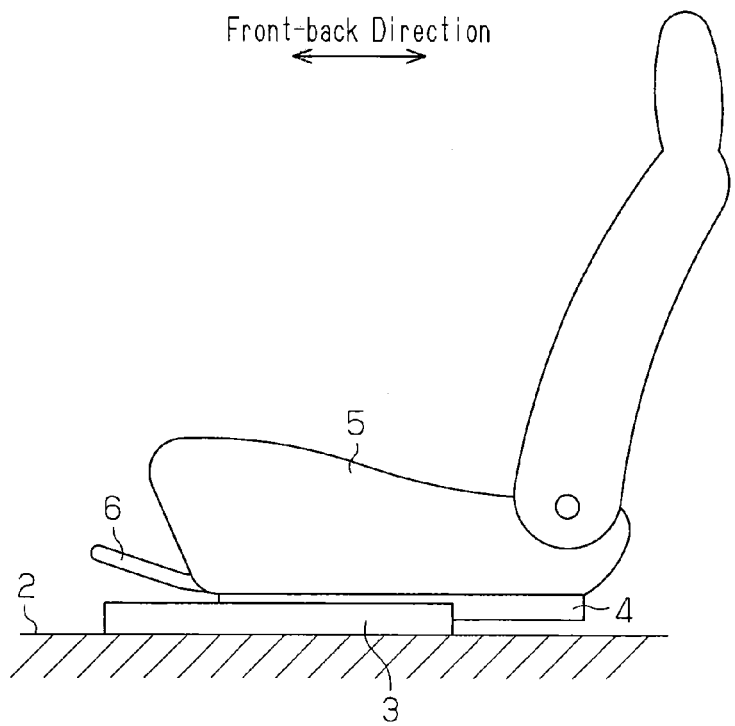
FIG. 1 is a schematic side view illustrating a seat sliding device and a vehicle seat according to an embodiment of the present invention.

An embodiment of the present invention will now be described with reference to FIGS. 1 to 7. As shown in FIG. 1, lower rails 3, which serve as first rails, are fixed to a vehicle floor 2 such that each lower rail 3 extends in the front-back direction of a vehicle. Upper rails 4, which serve as second rails, are mounted on the corresponding lower rails 3 and movable manner relative to the corresponding lower rails 3 in the front-back direction.

FIG. 1 shows one of two paired sets of the lower rail 3 and the upper rail 4. The two paired sets are spaced apart from each other in the lateral direction of the vehicle (the direction perpendicular to the plane of FIG. 1). The left one of the paired sets facing toward the front is shown in FIG. 1. A seat 5 for seating a passenger is fixed to and supported by the upper rails 4. The movement of the upper rails 4 relative to the lower rails 3 is basically restricted. A release handle 6, which serves as an operation member, is provided to cancel the restriction.

Figure 2:
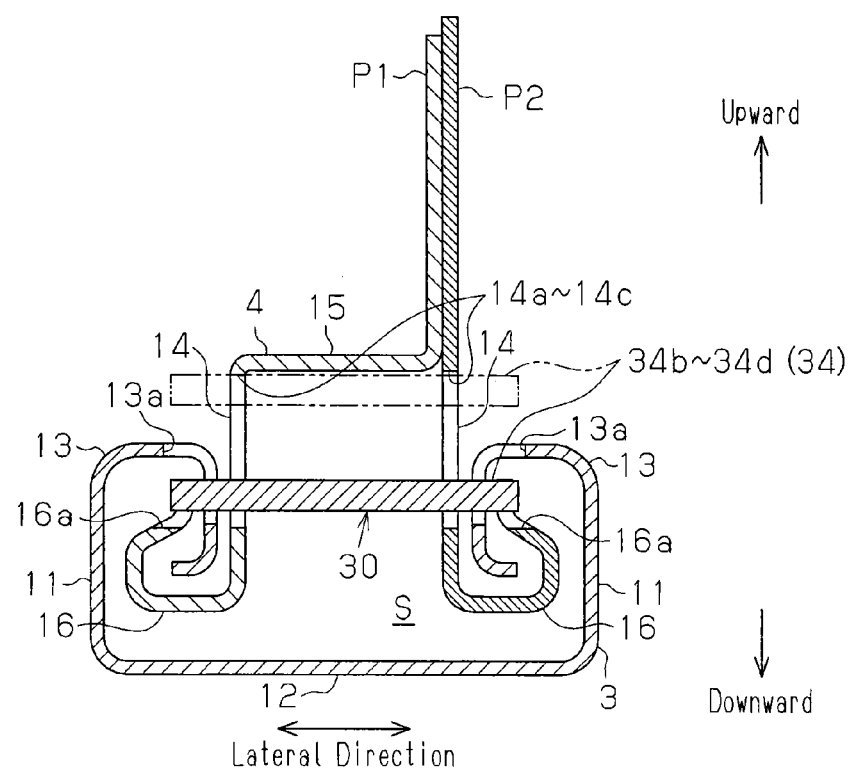
FIG. 2 is a cross-sectional view illustrating the seat sliding device shown in FIG. 1 taken along line 2-2 in FIG. 3(a)

As shown in FIG. 2, the lower rail 3 is formed by a plate and includes two first side walls 11, which project from the two lateral sides, and a first coupling wall 12, which couples basal ends, that is, lower ends of the first side walls 11. A first folded wall 13 extends inward in the lateral direction from a distal end, or upper end, of each first side wall 11 and is further folded back toward the coupling wall 12 such that the first folded wall 13 is formed continuously with the first side wall 11.

The upper rail 4 is formed by joining an upper end of substantially stair-shaped plate P1 and an upper end of a substantially flat plate P2. The upper rail 4 includes two second side walls 14, which serve as side walls and extend in the vertical direction between the first folded walls 13 of the lower rail 3, and a second coupling wall 15, which serves as a coupling wall and couples basal ends, or upper ends, of the second side walls 14 that are separated from the lower rail 3. The upper rail 4 includes a vertical wall 17 formed by the joined portions of the plate P1 and the plate P2 and extending upward along one side (right side as viewed in the drawing) of the second side wall 14. A second folded wall 16, which extends outward in the lateral direction from a distal end, or lower end, of each second side wall 14 is folded to be surrounded by the corresponding first side wall 11 and the corresponding first folded wall 13 such that the second folded wall 16 is continuous with the second side wall 14.

In this manner, the lower rail 3 and the upper rail 4 each have a substantially U-shaped cross-section and are engaged with each other such that their openings face each other. The engagement of the first folded wall 13 and the second folded wall 16 mainly restricts separation of the lower rail 3 and the upper rail 4 in the vertical direction. The lower rail 3 and the upper rail 4 form a rail cross-section that is substantially tetragonal and box-shaped. The lower rail 3 and the upper rail 4 cooperate to configure an inner space S.

As shown in FIGS. 3(a) and 3(b), two rollers 20, a front one and a rear one, are arranged between each second folded wall 16 and the opposing first side wall 11. The upper rail 4 is supported to be slidable relative to the corresponding lower rail 3 in the longitudinal direction (front-back direction) by allowing the rollers 20 to roll between the upper rail 4 and the lower rail 3.

A plurality of tetragonal lock holes 13a are formed in predetermined intervals in the longitudinal direction of each lower rail 3 in the basal ends, or upper ends, of the two first folded walls 13 of each lower rail 3. The lock holes 13a are open upward.

A plurality of (three) bores 14a, 14b, and 14c are formed in the predetermined intervals in the longitudinal direction of each upper rail 4 in intermediate portions of the two second side walls 14 of the upper rail 4 in the longitudinal direction. The bores 14a to 14c are open in the lateral direction and arranged at positions that may be aligned with a plurality of (three) of the lock holes 13a that are arranged next to one another in the longitudinal direction of the lower rail 3.

A plurality of (three) fitting grooves 16a are formed in the predetermined intervals in the longitudinal direction in the distal ends, or upper ends, of the two second folded walls 16 of the upper rail 4. The fitting grooves 16a are open upward and respectively arranged facing the bores 14a to 14c in the lateral direction. The fitting grooves 16a are arranged at positions that may be aligned with a plurality of (three) the lock holes 13a that are arranged next to one another in the longitudinal direction of the lower rail 3.

Two circular bearing holes 21 are arranged to face each other in the lateral direction frontward from the bores 14a to 14c in the two second side walls 14 of the upper rail 4. The axes of the bearing holes 21 extend in the lateral direction. A substantially tetragonal frame-shaped support wall 22 is formed by cutting out and bending a front end portion of the second side wall 14 of the plate P2 in one side of the upper rails 4, that is, the lower side of the upper rails 4 in FIG. 3(a), in the lateral direction of the second side wall 14 toward the space S. That is, as shown in FIGS. 4(a) and 4(b), the support wall 22 has an upper rim 22a and a lower rim 22b, which are arranged in the height direction and extend in the lateral direction, and a pair of side rims 22c and 22d, which are arranged in the lateral direction and connect free ends and fixed ends of the upper rim 22a and the lower rim 22b in the height direction. A support hole 22e, which is open in the front-back direction, is formed in the support wall 22.

As shown in FIG. 4(a), a hook-shaped stopper 23 is formed by cutting out and bending the second coupling wall 15 of each upper rail 4 downward into the space S rearward from the support wall 22. Two substantially tetragonal support holes 24, which are arranged in the front-back direction, are formed in the second coupling wall 15 of the upper rail 4 frontward from the bearing holes 21 and rearward from the stopper 23.

Figure 5:
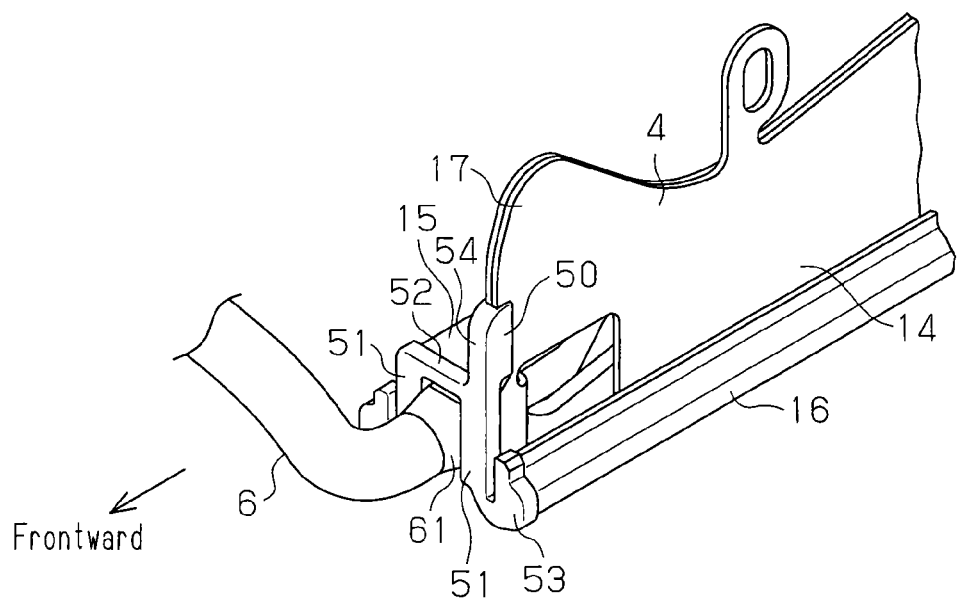
FIG. 5 is a perspective view illustrating a portion of the seat sliding device.

As shown in FIG. 5, a plastic cover 50 is mounted on a front end, or first end, of the upper rail 4 to cover the first end. The cover 50 has two lateral wall cover portions 51 mounted on the first end of the upper rail 4, that is, the front ends of the two second side walls 14, and a coupling wall cover portion 52, which connects upper ends of the lateral wall cover portions 51 and is also mounted on the second coupling wall 15 at the first end. The cover 50 is substantially U-shaped in conformance with a projected plane of the upper rail 4 as viewed in the longitudinal direction. As shown in FIGS. 4(a) and 4(b), a fitting groove 55 having a substantially L-shaped cross-section is formed by cutting out the cover 50 in conformance with a corner of the upper rail 4 located at the first end and facing the space S.

As shown in FIG. 5, the cover 50 has folded wall cover portions 53, which extend outward in the lateral direction from lower ends of the two lateral wall cover portions 51 and which are mounted on the second folded walls 16 of the first end of the upper rail 4, and a vertical wall cover portion 54, which extends upward from the coupling wall cover portion 52 and also mounted on a basal end of the first vertical wall 17.

Figure 6A:
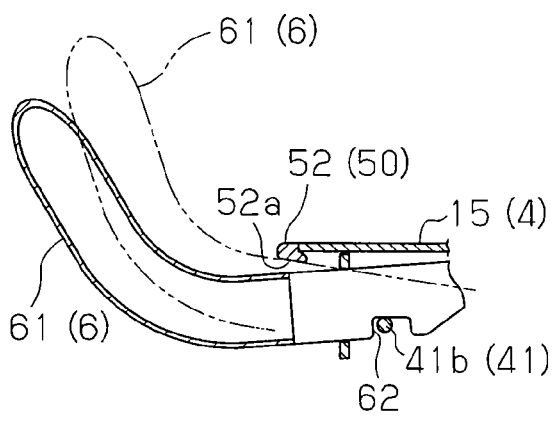
FIG. 6(a) is a cross-sectional view illustrating the movement of the seat sliding device.
Figure 6B:
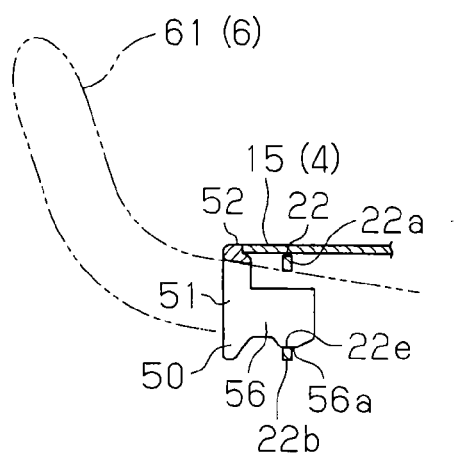
FIG. 6(b) is a cross-sectional view illustrating the movement of the seat sliding device.
Figure 7A:
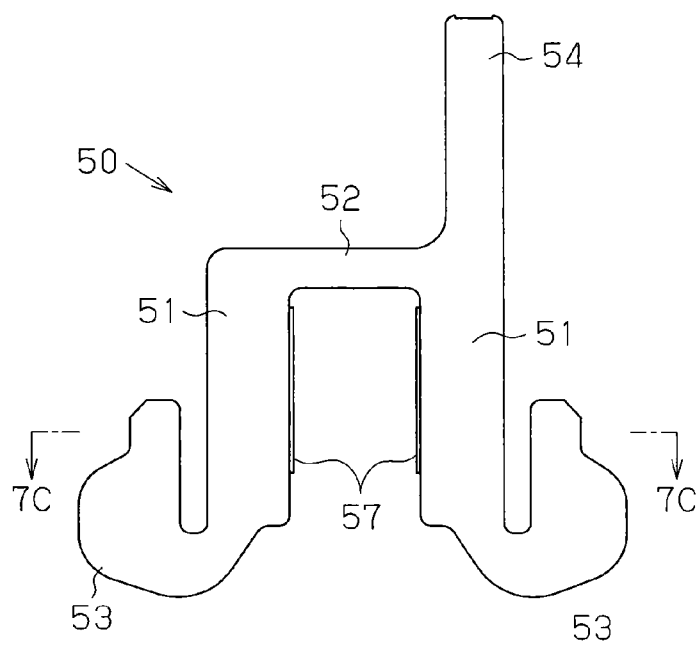
FIG. 7(a) is a front view illustrating a cover.
Figure 7B:
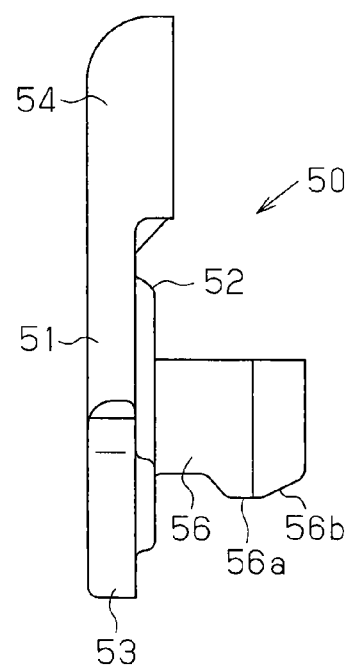
FIG. 7(b) is a side view illustrating the cover.
Figure 7C:
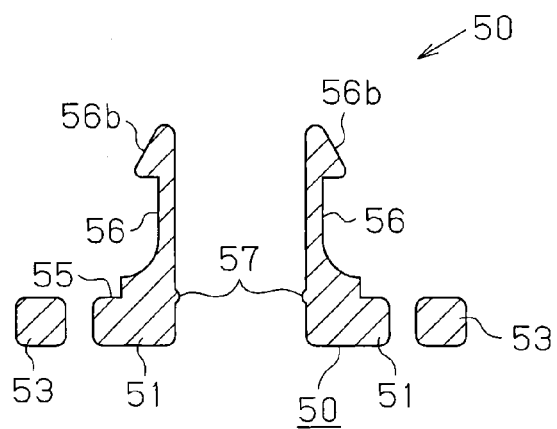
FIG. 7(c) is a cross-sectional view taken along line 7C-7C in FIG. 7(a).

As shown in FIG. 6(a), a lower surface of the coupling wall cover portion 52 defines a slanted surface 52a having a slanting angle set to rise toward the front with a cross-section reduced forward to form a slanted angle. As shown in FIG. 6(b), a flange-shaped engagement piece 56 is integrally formed with each lateral wall cover portion 51. The engagement piece 56 extends rearward along an inner wall surface of the lateral wall cover portion 51. The engagement piece 56 is inserted into the support hole 22e of the support wall 22 when the cover 50 is engaged with the first end of the upper rail 4. The engagement piece 56 has an engagement projection 56a, which is curved and protruded downward. The engagement piece 56 is set such that the engagement projection 56a presses and contacts the lower rim 22b of the support wall 22. As shown in FIGS. 7(a) to 7(c), a hook-shaped engagement hook 56b, which protrudes outward in the lateral direction, is formed on a distal end of each engagement piece 56, which extends through the support hole 22e. Each engagement hook 56b engages the corresponding one of the side rims 22c and 22d of the support wall 22. A strip-shaped sliding bead 57 is formed on each lateral wall cover portion 51. The sliding bead 57 extends such that it protrudes from an inner wall surface of the lateral wall cover portion 51 inward in the lateral direction. The sliding bead 57 extends in the height direction.

As shown in FIGS. 3(a) and 3(b), an engagement member 30, which is formed by a plate, is arranged in the space S defined between the lower rail 3 and the upper rail 4 such that the engagement member 30 extends in the front-back direction. The engagement member 30 has two vertical walls 31 extending upward from two edges, in the lateral direction, of a longitudinally intermediate portion of the engagement member 30. The distance between the vertical walls 31 in the lateral direction is set to be smaller than the distance between the two second side walls 14 of the upper rail 4 in the lateral direction. Two shafts 32, which are supported by the bearing holes 21, protrude outward in the lateral direction from rear ends of the vertical walls 31. Each shaft 32 has a substantially cylindrical shape and includes a closed end. The shafts 32 are fitted into and are supported by the bearing holes 21 so that the engagement member 30 is coupled with the upper rail 4 in a pivotal manner about an axis that extends in the lateral direction.

An input unit 33, which extends forward and has a smaller width than the distance between the two vertical walls 31 in the lateral direction, is formed frontward from the vertical walls 31 of the engagement member 30. As shown in FIG. 4(a), a front end of the input unit 33 forms a contact portion 33a having the shape of a substantially arcuate wall that bulges upward. A flat engagement unit 34, which extends rearward, is formed rearward from the two vertical walls 31 of the engagement member 30. As shown in FIG. 3 (a), the engagement unit 34 includes a substantially tetragonal main body 34a, which has a smaller width than the distance between the two second side walls 14 of the upper rail 4 in the lateral direction, and a plurality of (three on each side, six in total) engagement hooks 34b, 34c, and 34d, which protrude outward from a rear end of the main body 34a in the lateral direction. The engagement hooks 34b to 34d on each side are arranged in the longitudinal direction (front-back direction) of the engagement member 30 in the predetermined intervals. The engagement member 30, which is coupled to the upper rail 4, is permitted to pivot about the shafts 32 under a situation in which the main body 34a is arranged between the two second side walls 14 and the engagement hooks 34b to 34d are all inserted into the corresponding bores 14a to 14c from the inner side and provided with play.

As shown by the solid lines in FIG. 2, when the engagement member 30 pivots about the shafts 32 such that the engagement unit 34 is lowered, each of the engagement hooks 34b to 34d can be fitted into the corresponding one of the lock holes 13a and the corresponding one of the fitting grooves 16a. When each of the engagement hooks 34b to 34d is fitted into the corresponding one of the lock holes 13a and the corresponding one of the fitting grooves 16a, each of the engagement hooks 34b to 34d fits into the corresponding one of the lock holes 13a between the bores 14a to 14c and the fitting grooves 16a, into which the engagement hooks 34b to 34d are inserted. This restricts relative movement of the lower rail 3 and the upper rail 4 in an appropriate manner.

In contrast, as shown by the double-dashed lines in FIG. 2, when the engagement member 30 pivots about the shafts 32 such that the engagement unit 34 is raised, each of the engagement hooks 34b to 34d is set to be removed from the corresponding one of the lock holes 13a. This cancels the restriction of the relative movement of the lower rail 3 and the upper rail 4.

As shown in FIGS. 3(a) and 3(b), a torsion spring 41, which serves as a biasing member and is made of a wire material, is arranged in the space S defined between the lower rail 3 and the upper rail 4. The torsion spring 41 is substantially C-shaped and open rearward as viewed from above. The torsion spring 41 has two bilaterally symmetric extended portions 41a, which extend in the front-back direction, and a connecting portion 41b, which connects front ends of the two extended portions 41a in the lateral direction. The torsion spring 41 is positioned in the space S and fastened to the second coupling wall 15 to partially protrude from the two support holes 24. Further, rear ends of the extended portions 41a elastically contact an upper surface of the engagement unit 34 at a location rearward from the bearing holes 21 (shafts 32). Accordingly, the engagement unit 34 of the engagement member 30 is biased by the torsion spring 41 in the direction in which the engagement unit 34 is lowered, that is, in the direction in which each of the engagement hooks 34b to 34d is fitted into the corresponding one of the lock holes 13a and the corresponding one of the fitting grooves 16a. The connecting portion 41b of the torsion spring 41 is arranged between the support wall 22 and the stopper 23 in the front-back direction.

The release handle 6 is formed by bending a tubular material. The release handle 6 is formed such that it bridges the two upper rails 4 in the lateral direction at the front ends of the two upper rails 4. As shown in FIGS. 4(a) and 4(b), a distal portion 61, which extends rearward of the release handle 6, has the shape of a substantially tetragonal tube with a smaller size than the opening width of the support wall 22 (support hole 22e). A bottom wall of the release handle 6 includes a slit-shaped support groove 62. A pressing portion 63 is formed by pressing a rear end of the distal portion 61 in the vertical direction into a flat shape.

When each distal portion 61 is inserted into the corresponding support wall 22 from the front, the connecting portion 41b of the torsion spring 41 is fitted into the support groove 62. This locks and restricts separation of the release handle 6. At this time, each distal portion 61 is biased by the torsion spring 41 in the support groove 62 and raised. This holds the distal portion 61 such that the upper surface of the distal portion 61 contacts the opposing inner wall surface of the support wall 22. At this time, as shown in FIG. 4(a), the pressing portion 63 is arranged at the upper side of the input unit 33 of the engagement member 30 with a gap provided in between. That is, the torsion spring 41 further functions to elastically hold the release handle 6 at a predetermined initial position such that the release handle 6 maintains a predetermined linked state with the engagement member 30.

When the release handle 6 (distal portion 61) is held above the upper portion of the upper rail 4, the cover 50 is pressed against the distal portion 61 at the two sliding beads 57. This is to position the distal portion 61 of the release handle 6 in the lateral direction in a further stable state with the two sliding beads 57, which linearly contact the distal portion 61.

When the distal portion 61 of the release handle 6 pivots in the clockwise direction as shown in FIG. 4(a) about a contact point (hereinafter, referred to as "support point O1") between the distal portion 61 and the support wall 22, the input unit 33 of the engagement member 30 is lowered so that the engagement member 30, which is pressed by the pressing portion 63, pivots in the counterclockwise direction as shown in FIG. 4(a). This moves the engagement unit 34 of the engagement member 30 in the direction in which the engagement unit 34 is raised against the biasing force of the torsion spring 41, that is, each of the engagement hooks 34b to 34d is removed from the corresponding one of the lock holes 13a. The support point for the pivoting of the distal portion 61 (release handle 6) is set using the support wall 22 to balance the operation force and the operation amount of the release handle 6 necessary to release the engagement member 30 based on the principle of leverage. The pivot direction of the engagement member 30 is opposite to the pivot direction of the release handle 6.

When the distal portion 61 contacts the coupling wall cover portion 52 of the cover 50 as the distal portion 61 of the release handle 6 pivots, the distal portion 61 comes into planar contact with the slanted surface 52a. That is, the slanted angle of the slanted surface 52a is set at an angle that is the same as the slanted angle of the distal portion 61 when the distal portion 61 presses the coupling wall cover portion 52. This is to disperse loads on the contact surface when the distal portion 61 contacts and presses the coupling wall cover portion 52 through the planar contact with the slanted surface 52a. At this time, the cover 50 is pressed by the distal portion 61 so as to pivot about the coupling wall cover portion 52. However, the pivoting of the cover 50 is limited by the engagement pieces 56, which are engaged with the support wall 22. This suppresses removal of the cover 50 from the first end of the upper rail 4, which is caused by the pivoting of the cover 50.

When the release handle 6 (distal portion 61) is held above the upper portion of the upper rail 4, the stopper 23 is arranged to block the rearward movement track of the pressing portion 63. When inserting each distal portion 61 into the support wall 22 during a coupling process of the release handle 6, the engagement of the stopper 23 obviates excessive insertion of the distal portion 61.

Next, the operation of the present embodiment will be described.

First, it is assumed that the operation force of the release handle 6 is released. At this time, each distal portion 61, which is biased and held by the torsion spring 41 in the support groove 62, is positioned such that the upper surface of the distal portion 61 contacts the opposing surface of the support wall 22 (upper rim 22a). The pressing portion 63 is arranged above the input unit 33 of the engagement member 30 with a gap provided in between. Accordingly, the engagement member 30 released from the distal portion 61 (release handle 6) is biased by the torsion spring 41 in the direction in which the engagement unit 34 is lowered, that is, in a direction in which each of the engagement hooks 34b to 34d is fitted into the corresponding one of the lock holes 13a and the corresponding one of the fitting grooves 16a. This fits each of the engagement hooks 34b to 34d into the corresponding one of the lock holes 13a and the corresponding one of the fitting grooves 16a thus restricting relative movement of the lower rail 3 and the upper rail 4 in an appropriately manner. Further, the position of the seat 5 supported by the upper rails 4 in the front-back direction is maintained.

Here, it is assumed that the release handle 6 is operated to raise its front end. At this time, the distal portion 61 pivots about the support point O1 in the direction in which the pressing portion 63 is lowered. Thus, the pressing portion 63 presses the input unit 33 of the engagement member 30. Accordingly, the engagement member 30 pivots in the direction in which the engagement unit 34 is raised about the shafts 32 against the biasing force of the torsion spring 41, that is, in the direction in which each of the engagement hooks 34b to 34d is removed from the corresponding one of the lock holes 13a. Therefore, each of the engagement hooks 34b to 34d is removed from the corresponding one of the lock holes 13a to cancel the restriction of the relative movement of the lower rail 3 and the upper rail 4. This allows for position adjustment of the seat 5, which is supported by the upper rails 4, in the front-back direction.

As described in details above, the present embodiment has the following advantages.

(1) The cover 50, which closes the first end, or the front end of the upper rail 4, is mounted on the first end. Thus, exposure of the first end is limited, and direct interference of the first end with the surrounding parts is avoided. Further, for example, when the vehicle vibrates and swings the release handle 6 about the portion contacting the support wall 22 (support point O1), the release handle 6 is brought into contact with the cover 50 (coupling wall cover portion 52) when the release handle 6 approaches the second coupling wall 15 of the first end of the upper rail 4. Accordingly, the release handle 6 may limit the generation of noise as compared to when the release handle 6 directly contacts, for example, the first end (e.g., metal contact). That is, the coupling wall cover portion 52 functions as a simple stopper in the input direction during a release operation of the release handle 6 so that pivoting (backlash) in the input direction and the generation of the noise caused by the pivoting are suppressed. Further, when the release handle 6 is pivoted against the biasing force of the torsion spring 41 to transmit operation force that cancels the restriction of the relative movement of the lower rail 3 and the upper rail 4 to the engagement member 30, even if the cover 50 is pressed by the release handle 6, pivoting of the cover 50 resulting from the pressing is restricted by the engagement pieces 56. That is, the two engagement pieces 56 function as stoppers for the cover 50 in the input direction during a release operation of the release handle 6 to limit pivoting (backlash) in the input direction. Accordingly, separation of the cover 50 from the first end is limited when the cover 50 is pivoted. That is, the cover 50 functions to limit noise by contacting the release handle 6, while functioning to prevent removal of the cover 50 from the first end with the engagement pieces 56 when the cover 50 is pressed by the release handle 6.

(2) The release handle 6 inserted into the upper rail 4 on which the cover 50 is mounted is positioned in the lateral direction when pressed against the two sliding beads 57. The two sliding beads 57 limit the backlash of the release handle 6 in the lateral direction. Accordingly, while positioning the release handle 6 in the lateral direction in a more stable state with the two sliding beads 57 that contact the release handle 6 in a concentrated manner, that is, linearly contacts the release handle 6, an increase in the sliding resistance during the release operation, that is, a decrease in the operability of the release handle 6 may be limited. Further, the backlash in the lateral direction and the pivot direction during the release operation of the release handle 6, and the generation of noise caused by the backlash are limited.

(3) When the release handle 6 pivots and thereby presses the cover 50, the release handle 6 presses, in planar contact, the slanted surface 52a of the cover 50 (coupling wall cover portion 52), which has a slanted angle set for such a case. This disperses the load on the portion that contacts the cover 50. Therefore, the case that the cover 50 is pressed by the centered loads from the release handle 6 is avoided so that the deformation of the cover 50 is limited.

(4) Since the engagement hooks 56b are engaged with the side rims 22c and 22d of the support wall 22, separation of the cover 50 is restricted in the direction of the relative movement (front-back direction) of the lower rail 3 and the upper rail 4.

(5) When the distal portion 61 of the release handle 6 is excessively inserted into the support wall 22 of the upper rail 4, the rear end of the pressing portion 63 contacts and engages with the stopper 23. This obviates such an excessive insertion of the distal portion 61 of the release handle 6. Since the stopper 23 is formed through a simple process of just cutting out and bending the second coupling wall 15 of the upper rail 4, the number of parts and the number of manufacturing steps may be reduced.

The above described embodiment may be modified as follows.

The distal portion (61) of the release handle 6 may be cylindrical. In this case, the distal portion of the release handle 6 comes into point contact with the sliding beads 57.

The sliding beads 57 may extend in any direction as long as the direction is transverse to a path along which the release handle 6 is inserted.

The support wall 22 may be configured by only the upper rim 22a and the lower rim 22b, and the side rims 22c and 22d may be omitted. That is, the support wall 22 need not be shaped like a tetragonal frame.

A biasing member configured by a plate spring may be adopted in place of the torsion spring 41.

The biasing member, which biases the engagement member 30, and a member, which holds the release handle 6 (distal portion 61), may be separately provided.

The fixing relationship (that is, vertical arrangement) of the lower rails 3 and the upper rails 4 to the vehicle floor 2 and the seat 5 may be inversed.

DESCRIPTION OF THE REFERENCE NUMERALS

S . . . Space, 2 . . . Vehicle Floor, 3 . . . Lower Rail (First Rail), 4 . . . Upper Rail (Second Rail), 5 . . . Seat, 6 . . . Release Handle (Operation Member), 11 . . . First Side wall, 12 . . . First Coupling wall, 13 . . . First Folded Wall, 13a . . . Lock Hole (Portion to be Locked), 14 . . . Second Side Wall (Side wall), 14a to 14c . . . Bores, 15 . . . Second Coupling Wall (Coupling Wall), 16 . . . Second Folded Wall (Folded Wall), 22 . . . Support Wall, 30 . . . Engagement Member, 41 . . . Torsion Spring (Biasing Member), 50 . . . Cover, 51 . . . Lateral Wall Cover Portion, 52 . . . Coupling Wall Cover Portion, 52a . . . Slanted Surface, 56 . . . Engagement piece, 56a . . . Engagement Projection, 56b . . . Engagement Hook, and 57 . . . Sliding Bead (Sliding Portion).

The invention claimed is:

1. A vehicle seat sliding device comprising:
a first rail adapted to be fixed to one of a vehicle floor and a seat;
a second rail adapted to be fixed to the other one of the vehicle floor and the seat, wherein the second rail is coupled to be movable relative to the first rail, and the second rail includes
two side walls arranged in a lateral direction that is perpendicular to a longitudinal direction of the second rail,
a coupling wall, which is arranged to face the first rail in a vehicle height direction and which couples basal ends of the side walls that are separated from the first rail, and
a first end located at one end in the longitudinal direction;
an engagement member that selectively restricts and permits relative movement of the first rail and the second rail;
an operation member inserted into the second rail in the longitudinal direction, linked to the engagement member, and elastically held by a biasing member to come into contact with a support wall arranged in the second rail, wherein the operation member is configured to pivot about a location contacting the support wall against biasing force of the biasing member to approach a portion of the coupling wall at the first end of the second rail so that operation force for canceling the restriction of the relative movement is transmitted to the engagement member; and
a cover mounted on the first end of the second rail to close the first end, wherein the cover includes an engagement piece, which restricts pivoting of the cover when the cover is engaged with the support wall and is pressed against the operation member.

2. The vehicle seat sliding device according to claim 1, wherein the cover includes an opposing surface, which opposes the operation member at a portion corresponding to the two side walls, and a sliding portion, which protrudes from the opposing surface and extends in a direction transverse to a path along which the operation member is inserted into the second rail so that the sliding portion presses the operation member.

3. The vehicle seat sliding device according to claim 1, wherein the cover includes an opposing surface, which opposes the operation member at a portion corresponding to the coupling wall, and the opposing surface has a slanted surface set at an angle that is the same as a slanted angle of the operation member when the operation member presses the cover.

4. The vehicle seat sliding device according to claim 1, wherein
the support wall includes two side edges facing each other in the lateral direction and sandwiching the operation member, and
the cover includes two engagement hooks, which protrude outward in the lateral direction and are engaged with the side edges.

5. A vehicle seat sliding device comprising
a first rail adapted to be fixed to one of a vehicle floor and a seat;
a second rail adapted to be fixed to the other one of the vehicle floor and the seat, wherein the second rail is coupled to be movable relative to the first rail, and the second rail includes two side walls arranged in a lateral direction that is perpendicular to a longitudinal direction of the second rail, a coupling wall, which is arranged to face the first rail in a vehicle height direction and which couples basal ends of the side walls that are separated from the first rail, and a first end located at one end in the longitudinal direction;
an engagement member that selectively restricts and permits relative movement of the first rail and the second rail;
an operation member inserted into the second rail in the longitudinal direction, linked to the engagement member, and elastically held by a biasing member to come into contact with a support wall arranged in the second rail, wherein the operation member is configured to pivot about a location contacting the support wall against biasing force of the biasing member to approach a portion of the coupling wall at the first end of the second rail so that operation force for canceling the restriction of the relative movement is transmitted to the engagement member; and
a cover mounted on the first end to close the first end, wherein the cover includes an opposing surface, which opposes the operation member at a portion corresponding to the two side walls, and a sliding bead, which protrudes from the opposing surface and extends in a direction transverse to a path along which the operation member is inserted into the second rail to press the operation member.

6. The vehicle seat sliding device according to claim 2, wherein the cover includes an opposing surface, which opposes the operation member at a portion corresponding to the coupling wall, and the opposing surface has a slanted surface set at an angle that is the same as a slanted angle of the operation member when the operation member presses the cover.

7. The vehicle seat sliding device according to claim 2, wherein
the support wall includes two side edges facing each other in the lateral direction and sandwiching the operation member, and
the cover includes two engagement hooks, which protrude outward in the lateral direction and are engaged with the side edges.

8. The vehicle seat sliding device according to claim 3, wherein
the support wall includes two side edges facing each other in the lateral direction and sandwiching the operation member, and
the cover includes two engagement hooks, which protrude outward in the lateral direction and are engaged with the side edges.

* * * * *